United States Patent
Czyszczewski et al.

(10) Patent No.: US 7,359,078 B2
(45) Date of Patent: *Apr. 15, 2008

(54) REMOTE DATABASE SUPPORT IN A MULTIFUNCTION OFFICE DEVICE

(75) Inventors: Joseph Stanley Czyszczewski, Longmont, CO (US); James T Smith, II, Boulder, CO (US); Ivan Woehr, Superior, CO (US); Brian William Moroney, Longmont, CO (US); David George Greenwood, Lafayette, CO (US)

(73) Assignee: InfoPrint Solutions Company, Boulder, CO (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/030,338

(22) Filed: Jan. 6, 2005

(65) Prior Publication Data

US 2005/0219609 A1   Oct. 6, 2005

Related U.S. Application Data

(62) Division of application No. 09/557,118, filed on Apr. 24, 2000, now Pat. No. 6,867,876.

(51) Int. Cl.
*G06F 15/00* (2006.01)
*G06F 3/12* (2006.01)
(52) U.S. Cl. ..................... 358/1.15; 358/1.1
(58) Field of Classification Search ............ 358/1.1, 358/1.9, 1.13, 1.15, 448, 402, 474, 500
See application file for complete search history.

(56) References Cited

U.S. PATENT DOCUMENTS

| | | | |
|---|---|---|---|
| 5,740,353 A * | 4/1998 | Kreulen et al. | 714/42 |
| 6,006,281 A * | 12/1999 | Edmunds | 710/1 |
| 6,577,907 B1 * | 6/2003 | Czyszczewski et al. | 700/17 |
| 6,980,312 B1 * | 12/2005 | Czyszczewski et al. | 358/1.15 |

* cited by examiner

*Primary Examiner*—Gabriel Garcia
(74) *Attorney, Agent, or Firm*—Duft Bornsen & Fishman, LLP

(57) ABSTRACT

A multifunction device includes a multifunction controller, a first interface for receiving input data from a document source and a second interface for outputting processed input data to at least one printer, and a third interface for coupling to a global data communications network for receiving current document data, as well as up to date recipient contact information therefrom. A graphical user interface is provided to control the operation of the multifunction device, including controlling access to and searching of remote databases coupled to the global data communications network. The remote databases can include, by example, a database of forms, a security database, and a directory database. The graphical user interface can control the operation of the multifunction device for accessing and searching a database containing the recipient contact information for sending at least one of a facsimile or an e-mail that contains processed input data. The global data communications network can be the Internet, and at least one of the databases can be a web site containing the desired information, such as a database of current forms. The multifunction device can also include at least one local database that stores information that duplicates at least a portion of the information stored in the remote databases, where the at least one local database is accessible by the multifunction controller.

20 Claims, 15 Drawing Sheets

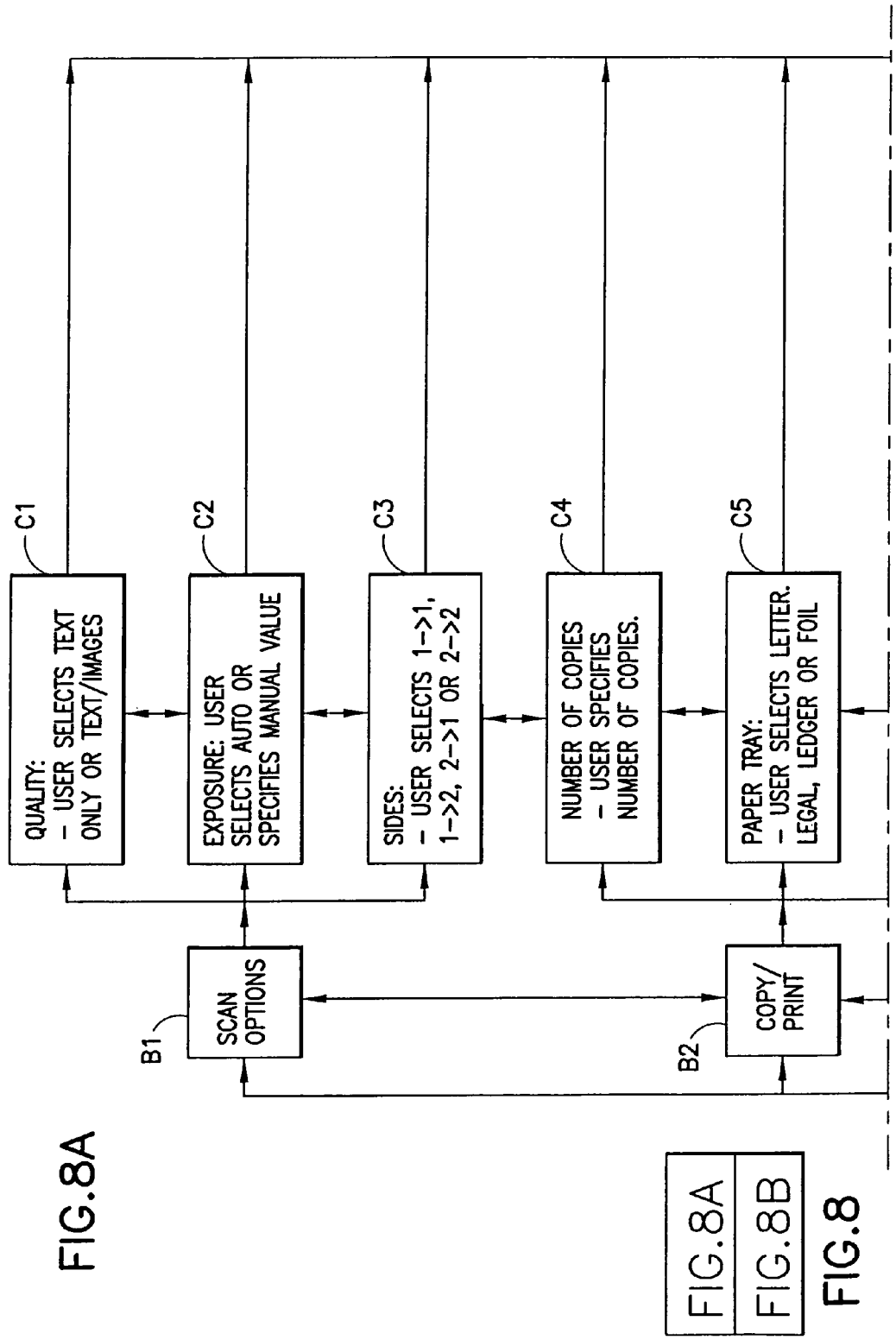

FIG.9C

REMOTE DATABASE SUPPORT IN A MULTIFUNCTION OFFICE DEVICE

This is a division of application Ser. No. 09/557,118 filed Apr. 24, 2000 now U.S. Pat. No. 6,867,876.

FIELD OF THE INVENTION

This invention pertains to multifunction devices such as, but not limited to, devices that integrate facsimile, scanner, copier and printer functions, and more particularly this invention relates to improved architectures and user interfaces for multifunction devices.

BACKGROUND OF THE INVENTION

Traditional multifunction devices are monolithic, are based on proprietary device controllers, and have small touch screen user interfaces. Some of these devices are beginning to add e-business capabilities such as e-mail and directory, but their functionality is restricted by their monolithic architecture, their proprietary controllers, and their limited user interfaces.

Modular networked image processing systems are known in the art. Reference in this regard may be had to U.S. Pat. No. 5,530,907, entitled "Modular Networked Image Processing System and Method Thereof", issued Jun. 25, 1996, by K. Pavey and D. Feitelberg.

Reference can also be had to commonly assigned U.S. Pat. No. 4,454,575, entitled "Shared Memory System with Access by Specialized Peripherals Managed by Controller Initialized by Supervisory CPU", issued Jun. 12, 1984, whereby a document distribution center is organized to process data in specialized peripherals devices.

OBJECTS AND ADVANTAGES OF THE INVENTION

It is a first object and advantage of this invention to provide an improved architecture and user interface for a multifunction device.

It is a further object and advantage of this invention to provide a capability for a multifunction device to gain access to remote databases wherefrom current document data as well as up to date recipient contact and other information can be retrieved.

SUMMARY OF THE INVENTION

The foregoing and other problems are overcome and the objects of the invention are realized by methods and apparatus in accordance with embodiments of this invention.

The teachings herein pertain to a multifunction device that includes a scanner, a printer, and a multifunction controller with a touch screen graphical user interface (GUI). The multifunction device supports scanning, printing, copying, sending and receiving facsimiles (faxes) and sending and receiving e-mails. In accordance with an aspect of these teachings, network connections are made between the printer and the multifunction controller. In addition, the scanner is also a modular device, and preferably uses a standardized personal computer (PC) interface, such as a SCSI interface. This arrangement enables the multifunction controller to work with a variety of printers and a variety of scanners, while maintaining the appearance of an integrated device. The teachings herein also provide for integrating in a modular way with directory, library, e-mail, e-fax and e-form middleware, as well as print management middleware, also referred to as print servers, to significantly extend the capabilities of the multifunction device.

The modularity of the multifunction device provides a number of advantages, in that the device is more affordable, has greater investment protection, is scalable, and has greater reach and availability.

One important aspect of these teachings is that by connecting the multifunction device to modular middleware services, such as external databases and services available over a network, the capabilities of the multifunction device are significantly extended, while at the same time delivering the desired additional capabilities with a simple interface.

Another feature of these teachings is the general purpose controller and the full size touch screen. That is, the multifunction controller is preferably implemented as a general purpose system, such as a PC or a workstation, while the related GUI is implemented as a full size touch screen. The general purpose multifunction controller enables modularity and middleware integration, while the full size touch screen enables a wider range of capabilities to be realized in the multifunction device than is possible with a traditional multifunction devices, without requiring the operator to have an specific computer skills.

The teachings found herein provide a cost effective multifunction device, as the multifunction controller and the scanner can be added to existing printers to create the multifunction device. The multifunction device is also more scalable than traditional multifunction devices. For example, when the capabilities of a first printer and/or scanner are outgrown, these components can be upgraded to higher capacity and higher performance devices. The multifunction device is also more scalable in that it can connect a plurality of scanners to one printer, or one scanner to a plurality of printers, or a plurality of scanners to a plurality of printers.

The teachings found herein also provide investment protection for the purchaser by allowing more advanced printers or scanners to replace older technology, without replacing the entire multifunction device. The multifunction device also has a greater reach than traditional multifunction devices, at least for the reason that the scanner can be remote from the printer, and exhibits greater availability since a backup printer can be selected if a local printer is out of service, and the multifunction device can thus continue to be used. The multifunction device is also more competitive than traditional devices, as it allows the best scanners and printers to be selected on their own merit, rather than being tied together in a monolithic device.

Integration with network-based services, such as a directory database, simplifies the identification of people and resources at the multifunction device, while integration with a document library database enables convenient access for the storage and retrieval of documents. In addition, integration of the multifunction device with electronic mail (e-mail) provides the flexibility to deliver information instantly and with greater reach than can be achieved with paper copies alone.

In a preferred embodiment the scanner component or components are coupled directly to a single, dedicated multifunction controller to allow rapid conversion of scanned documents to a desired printer format (e.g., a Postscript™ format) through a dedicated pipeline processor.

The multifunction controller may access a set of global services, such as forms, employee profiles, a fax server, an e-mail server, over a data communications network (such the Internet or a LAN), or it may incorporate these services locally. A plurality of multifunction controllers can be coupled together through a data network, and may share resources between themselves, including both global resources and local resources.

Forms accessed from a forms database are converted from their native format, for example, from a .pdf format, to a printer format (e.g., Postscript™) by the pipeline processor.

The multifunction controller also allows the modular replacement of printers and scanners, and also enables a user to send the same document to a number of printers, fax numbers, and e-mail addresses. The multifunction controller provides a user with an ability to request printing, to hold a document for later access, as well as to redirect a document to a desired printer or other output device.

The teachings herein also pertain to a multifunction copier device, which includes such functions as faxing, e-mailing, copying, and data storage/retrieval.

The teachings herein also provide an ability to dynamically and bidirectionally integrate remote datastores or databases, and provide access to the information locally or remotely. These teachings also support the exchange of information so that the multifunction device can retrieve information from, and insert information into, remote datastores. The datastore connection is preferably made through common networking interfaces, such as a global data communications network (the Internet is one example), and/or through a local area network (LAN).

The teachings herein provide a "kiosk"-type workflow and interface into remote datastores, allowing easy walkup access to complex tasks using a variety of remote datastores, such as corporate records databases and corporate forms databases.

By deploying a multifunction device with an internal set of functions, including as fax, copy and e-mail, these teachings provide access to data in conjunction with an ability for an operator to use all of the functions in the multifunction device. For example, the operator can retrieve a document or a form from a local or a remote datastore, and then fax, e-mail, copy and/or print the document on the multifunction device.

This information link is dynamic, that is, remote databases can be queried immediately or periodically, ensuring that all information presented to the user is the most current available, while also providing flexibility to ensure efficiency on the data communications network.

By integrating this level of connectivity into a multifunction device, the users need not be concerned with maintaining the latest information, as the latest versions of documents, forms and the like are always available and accessible. Furthermore, paper document storage is decreased, since the latest documents of an organization can be accessed and processed through the multifunction device on demand. Not only can these documents be printed, but other document handling functions of the multifunction device can be utilized, such as faxing and e-mailing.

In addition, the multifunction device can access remote datastores to obtain user-specific information, such as user profile and user security information, and can then utilize this user-specific information with various functions of the system, including keystroke saving functions, limitation of access rights, and accounting information.

The multifunction device may be considered as a configurable kiosk-like multifunction device that provides connectivity, preferably with a touch screen GUI, to many facets of an organization's infrastructure, thereby reducing costs and increasing productivity.

In accordance with the teachings of this invention there is provided a multifunction device having a multifunction controller, a first interface for receiving input data from a document source and a second interface for outputting processed input data to at least one printer, and a third interface for coupling to a global data communications network for receiving current document data, as well as up to date recipient contact information therefrom. A graphical user interface is provided to control the operation of the multifunction device, including controlling access to and searching of remote databases coupled to the global data communications network. The remote databases can include, by example, a database of forms, a security database, and a directory database. The graphical user interface can control the operation of the multifunction device for accessing and searching a database containing the recipient contact information for sending at least one of a facsimile or an e-mail that contains processed input data. The global data communications network can be the Internet, and at least one of the databases can be a web site containing the desired information, such as a database of current forms.

The multifunction device can also include at least one local database that stores information that duplicates at least a portion of the information stored in the remote databases, where the at least one local database is accessible by the multifunction controller.

BRIEF DESCRIPTION OF THE DRAWINGS

The above set forth and other features of the invention are made more apparent in the ensuing Detailed Description of the Invention when read in conjunction with the attached Drawings, wherein:

FIGS. 9A-9F are examples of screens displayed to a user of the multifunction device using the GUI.

DETAILED DESCRIPTION OF THE INVENTION

The disclosure of the above-mentioned commonly assigned U.S. Pat. No. 4,454,575, entitled "Shared Memory System with Access by Specialized Peripherals Managed by Controller Initialized by Supervisory CPU", issued Jun. 12, 1984, is incorporated by reference herein in its entirety.

Figure 1:
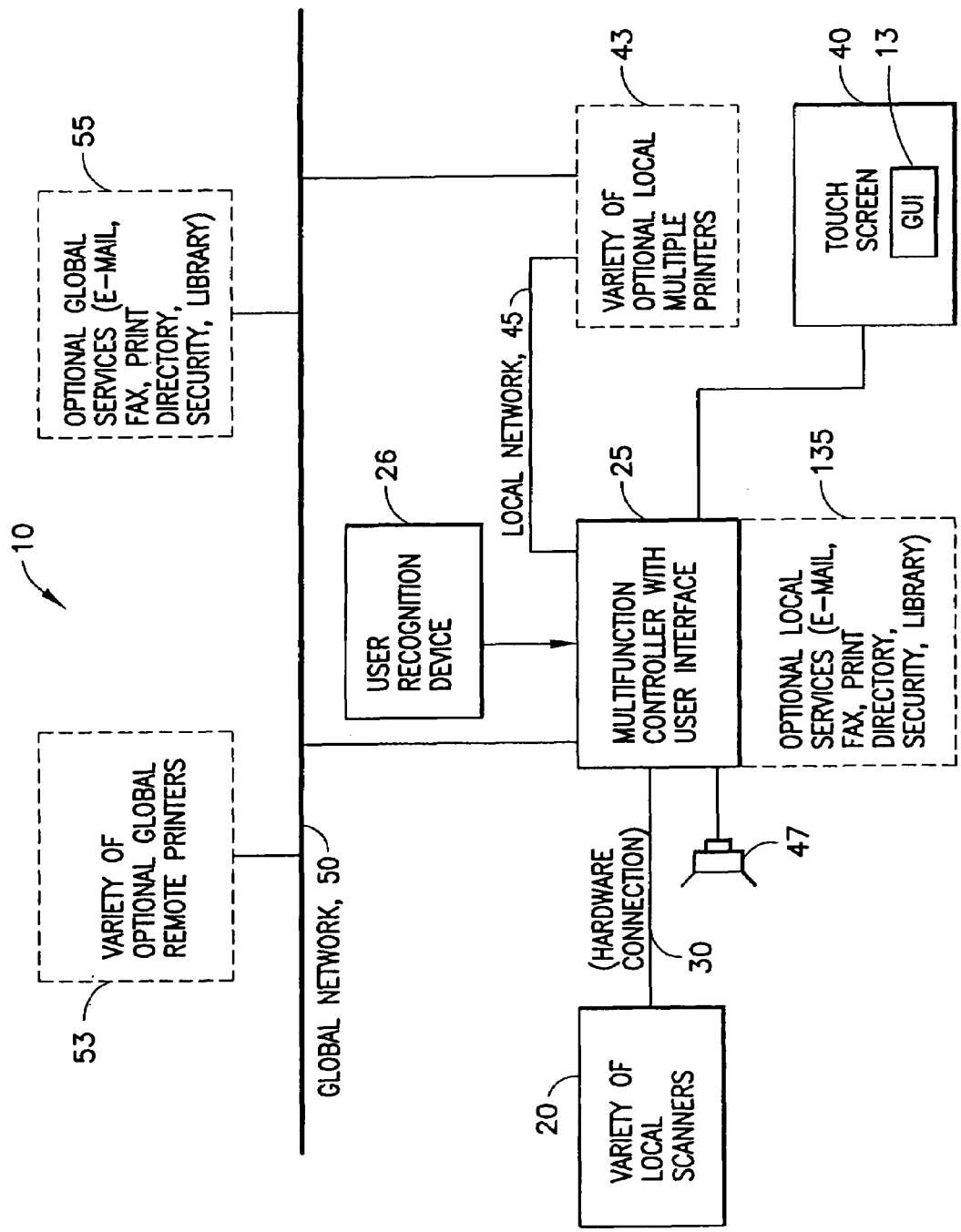
FIG. 1 is simplified block diagram of the multifunction device in accordance with the teachings herein, the multifunction device including a multifunction controller that is coupled to other components via local and global data communications networks.

FIG. 1 is a block diagram of a presently preferred embodiment of a multifunction device 10 in accordance with the teachings found herein. At least one scanner 20 is coupled to a multifunction controller 25 through a link 30, which is preferably a standard link, such as a SCSI interface. The multifunction controller 25 is coupled to a touch screen 40, which provides a Graphical User Interface (GUI) 13, and to an optional speaker 47 which can provide preprogrammed or synthesized audio responses to a user. The multifunction controller 25 is further optionally coupled to at least one printer 43 through a link 45, which is preferably a dedicated local network type interface. The printer 43 can be coupled separately to a global network 50 so that it can be accessed from other document sources, such as another multifunction controller 25 (see, for example, FIG. 3). The multifunction controller 25 is also coupled to the global network 50 and is thus capable of utilizing other optional global remote printers 53 on the global network 50. The multifunction controller 25 is thus also capable of communicating with, and utilizing, various optional global services 55 over the global network 50. The optional global services 55 can include, but are not limited to, e-mail, facsimile (fax), printer, directory, security and library services and datastores. The multifunction controller 25 is not limited to utilizing optional global services 55 on the global network 50, but also has the capability of implementing all or some of these services as optional, local services 135 at the controller 25. The optional global services 55 and the optional local services 135 are be explained in greater detail below.

An optional microphone (not shown) can also be included for providing voice recognition, voice commands and voice prompts, via a suitable voice recognition function.

An optional user recognition device 26, such as a retinal scanner, fingerprint recognizer, badge scanner or card reader can be provided as well.

It should be appreciated that a primary function of the multifunction device 10 lies in the generation, inputting, processing, transformation, printing, reproduction, duplication and export of document data, wherein document data is assumed, for the purposes herein, to include textual information expressed in any language or character set, as well as graphical information, such as mathematical symbols, as well as image information, such as scanned or electronically generated photographs, and any combination of textual, graphical and image information.

The scanner 20 and printer 43 may be any commercially available devices using industry standard interfaces for communication to the controller 25. This provides an advantage in that the controller 25 may be integrated with scanning and printing devices already in place. An additional advantage is that, as the scanner 20 or printer 43 reaches the end of its useful life, or additional features become available, the scanner 20 or printer 43 may be replaced, without replacing other components of the overall system that comprises the multifunction device 10.

As was mentioned above, the link 30 between the scanner 20 and the multifunction controller 25 is preferably an industry standard interface, such as a SCSI interface. It should be noted, however, that the link 30 and its interface is not limited to being a SCSI interface, but may be any interface suitable for communication between the multifunction controller 25 and the scanner 20. Specific instances of link 30 can be found as items 30A. 30B, . . . , 30N of FIG. 3.

Similarly, while the link 45 between the printer 43 and the multifunction controller 25 was described as a dedicated network type interface, the interface 45 is not limited to being a dedicated network interface, but may include any interface suitable for communication between the multifunction controller 25 and the printer 43. Specific instances of link 45 can be found as items 45A, 45B, . . . , 45N of FIG. 3.

The global network 50 can be any suitable network for linking the multifunction controller 25 to the optional remote printer 53 and to the optional global services 55. Global network 50 may include as a portion thereof one or more local area networks (LANs), a wide area network (WAN), an intranet and/or the Internet. It can be appreciated that the network 50 may be "global" in the sense that it reaches throughout the infrastructure of a particular organization, such as a corporation or a governmental department or agency, but it may not be directly accessible from outside of the organization.

Figure 2:
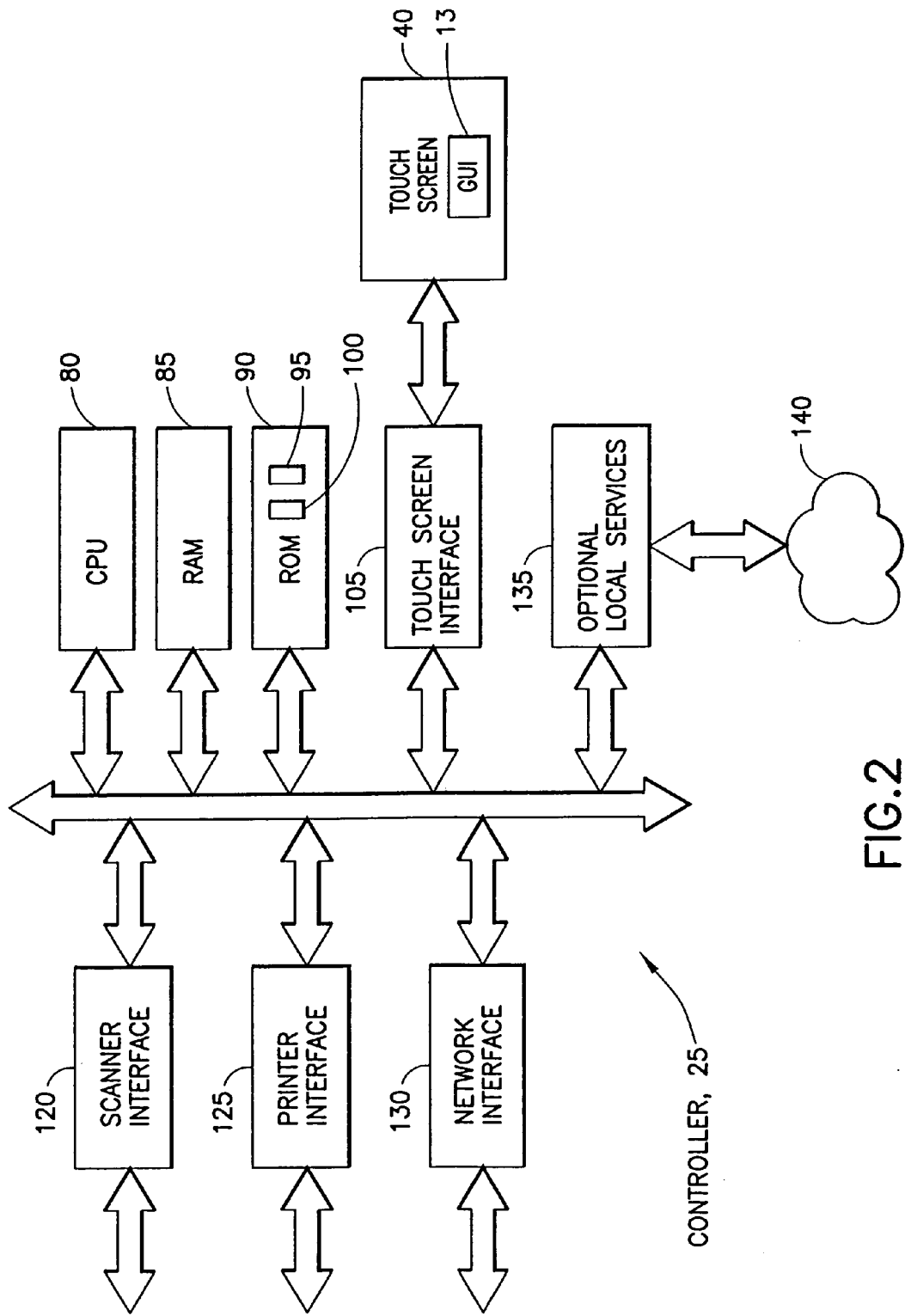
FIG. 2 is a block diagram that illustrates the multifunction controller of FIG. 1 in greater detail.

The controller 25 is shown in more detail in FIG. 2. The controller 25 includes a CPU 80, a random access memory (RAM) 85 for temporary storage of data, and a read only memory (ROM) 90 for permanent storage of data, which can include instructions for implementing a controller operating system 95, as well as a document processing pipeline program 100. In another, more preferred embodiment these programs are resident on one or more disk drives, and then loaded into RAM 85 prior to execution. The controller 25 also includes a touch screen interface 105 coupled to the touch screen 40. The touch screen 40 provides the Graphical User interface (GUI) 13 to the user of the multifunction system 10.

The controller 25 communicates with the scanner 20 (FIG. 1) through a scanner interface 120 (such as a SCSI interface), communicates with the printer 43 (FIG. 1) through a printer interface 125, and communicates with the global network 50 through a global network interface 130. The controller 25 may also include the optional local services 135.

It should be understood that the controller 25 may be constructed along the lines of, a standard computer or workstation architecture, and may include multiple data processors, and may execute an industry standard operating system, for example, Windows™, Windows NT™, OS/2™, or Linux™.

Figure 3:
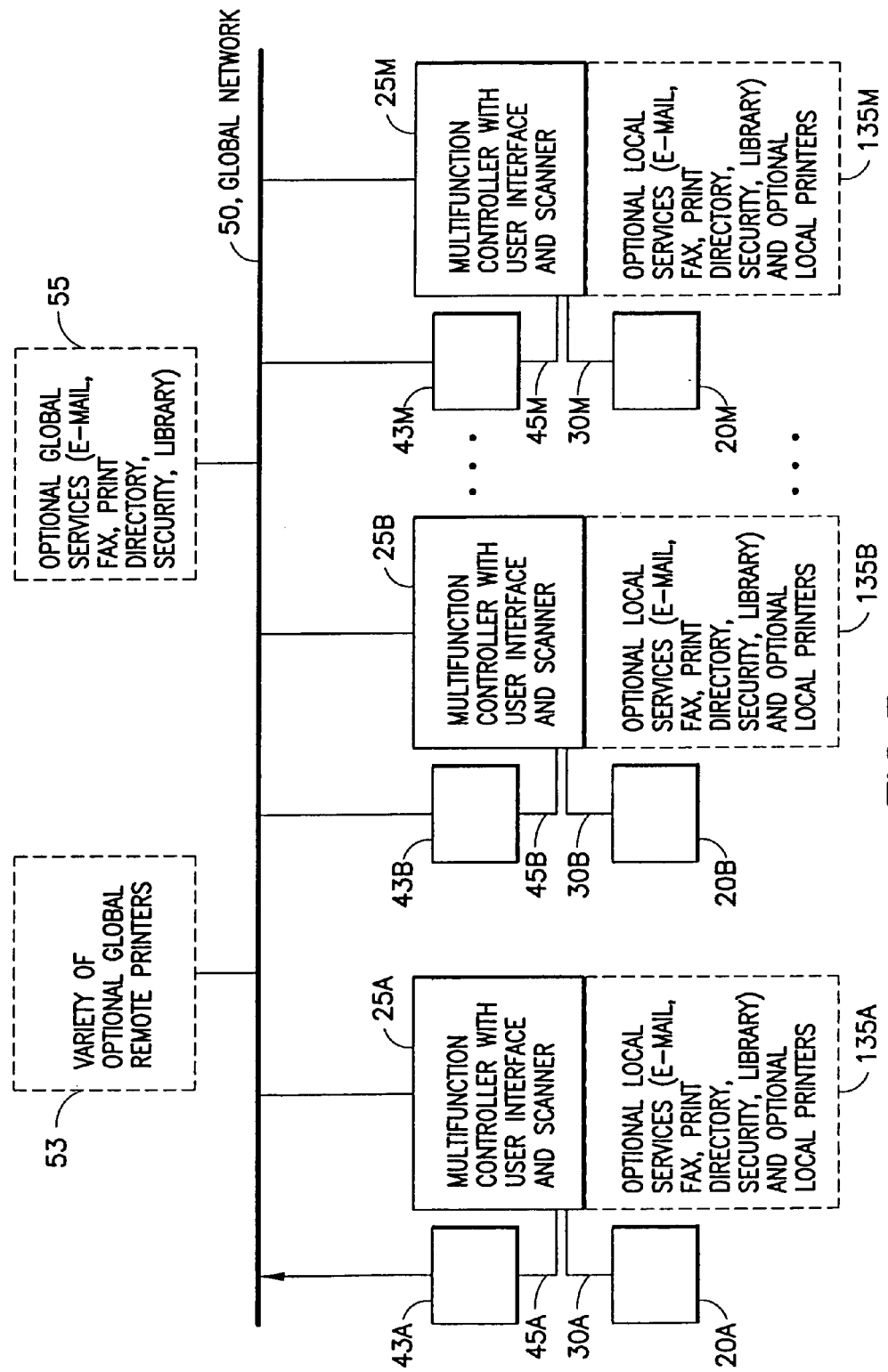
FIG. 3 is a block diagram that illustrates a plurality of multifunction controllers networked together into a distributed system of multifunction devices.

As is shown in FIG. 3, it should also be understood that a plurality of controllers 25A . . . 25n may be networked together, that is, operate together on the global network 50 as a single system within a single organization. The networked multifunction controllers 25A-25n may further communicate and share resources, for example, global remote printers 53, local scanners 20A-20n, local printers 43A-43n, optional global services 55, and optional local services 135A-135n. The optional global resources 55 include databases, servers, and other such services generally available through the network 50. In this case the various multifunction controllers 25A-25n and other network-connected devices are assumed to have unique network addresses so that messages and data con be routed to them as needed.

Figure 4:
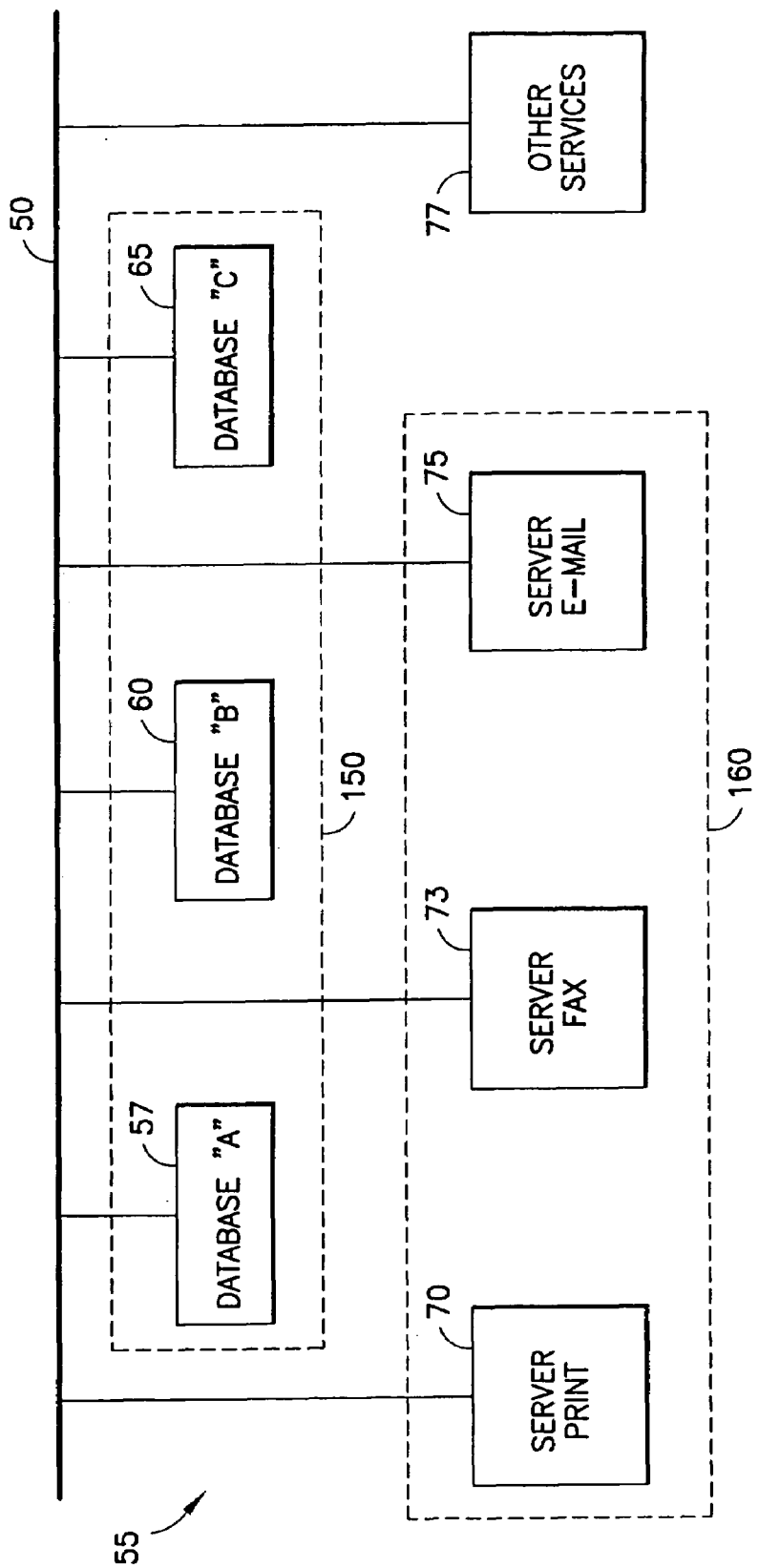
FIG. 4 is a block diagram that depicts a plurality of optional global services in greater detail, where the optional global services can be segregated by function, for example as databases, servers and other services.

FIG. 4 shows the optional global services 55 in greater detail. The optional global services may be segregated by functions, for example databases 150, servers 160, and other services 77. Databases A, B, and C (57, 60, and 65, respectively) may respectively store information regarding, for example, user profiles, user identification and forms, that is, copies of commonly used documents in electronic format. Servers 70, 73, and 75 may include, for example, a print server 70, a fax server 73 and an e-mail server 75. Having the optional global services 55 available on the global network 50 is advantageous in that all multifunction controllers 25 have access to the global services 55, regardless of location. Another advantage is that the centralized services may be upgraded in a modular fashion as they reach the end of their useful life, or as new features become available. The databases 150 serve as a single focal point of organization information, which simplifies changes and updates.

It should be understood that while the optional global resources 55 are shown in the context of a series of discrete services connected by global network 50, that they are not limited to a discrete, network-based implementation. The optional global services 55 may be incorporated in the multifunction controller 25 as the optional local services 135, and may remain accessible by other controllers on the global network 50. For the case where the optional local services 135 include a fax capability, the optional local services. 135 may include a connection to a telephone network 140, as shown in FIG. 2.

In accordance with one mode of operation, the user operates the multifunction device 10 by scanning a document using the scanner 20, or by retrieving a document from one of the optional global services 55 or the optional local services 135. The user then selects a destination, or destinations, for the document. Destinations may include local printers 43, network printers 53, fax machines 135, or Internet addresses, including e-mail addresses. After the destination(s) have been selected, the user operates the multifunction device 10 to send the document to the selected destination(s). It is important to note that the user has the ability to send a document to any number of destinations. That is, a single document may be sent to several printers, fax machines, and/or e-mail addresses if desired.

In the environment where a plurality of multifunction controllers 25 are networked together, as in FIG. 3, the multifunction device 10 can provide a capability for the user to select as a destination, for example, the printer 43$n$ connected to another controller 25$n$, and to then instruct the system to hold the document, that is, to refrain from printing it, until the user requests that the document be printed. After selecting a destination, and instructing the system to hold the document, the network of multifunction devices 10 operates to further allow the user to identify himself/herself to another multifunction device on the network, which then polls the other multifunction devices 10 to locate the document being held for the identified user, and to then allow the user to redirect the held document to a printer 43 of the user's choice.

Figure 6:
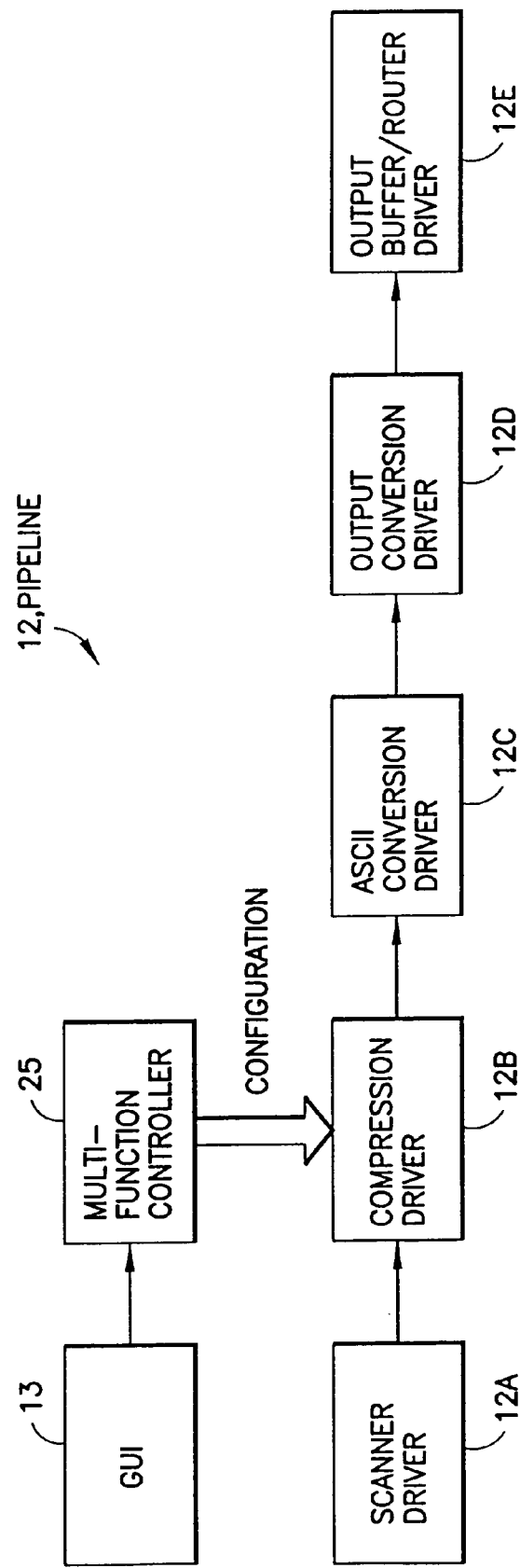
FIG. 6 depicts an example of a document processing pipeline that is implemented as a set of software drivers that are invoked based on user input through the Graphical User Interface (GUI)

In accordance with a further aspect of these teachings, and referring to FIG. 6, a document processing pipeline 12 is implemented as a set of software drivers that are invoked based on user input through the Graphical User Interface (GUI) 13. As was discussed above, the GUI 13 is preferably implemented using the touch screen display 40.

Referring to FIG. 6, the user first indicates, using the GUI 13, a desired document processing mode of operation to the multifunction device 10. This input causes the multifunction device 10 to select and interconnect a set of drivers for transforming document data from scanline information on one end to the appropriate digital representation on the other end.

Briefly stated, in one embodiment the pipeline 12 includes a driver 12A for the scanner 20 that connects to a driver 12B that compresses the scanner data. The compressed data is then provided to a driver 12C that converts the compressed data to an ASCII-representable set of codes, followed by a driver 12D that creates a Level 3 Postscript™ representation for the output device, such as one of the local printers 43 or global printers 53. The data is next fed to a final driver 12E that buffers the data while it simultaneously sends the data to whatever address, such as a printer address or an Internet address, that was specified.

An important aspect of the document processing pipeline 12 is its ability to transform scanline data into a standard format, which in the preferred implementation is the PostScript™ format. If the user desires to connect a different scanner 20 at one end of the pipeline 12, then the pipeline 12 begins with the appropriate driver for that scanner. Likewise, at the output end, if a different printer 43 or 53 is chosen, then the Postscript™ driver is adapted for the desired printer. If the end device is unknown, then no unique codes need be written to the datastream for the unknown output device (such as codes for stapling options, duplexing, output bins, etc.) However, generic printer codes can be included in the output datastream.

The output device does not have to be a printer. For example, in some cases the data is transformed into a .pdf format which is sent as e-mail. As such, the final section of the pipeline 12 could be a file driver or a socket connection.

The document processing pipeline 12 can thus be envisioned as a set of interchangeable stages or steps, with some being optional, that are comprised of code, with each sharing a common interface with other steps or pieces of code. When linked in the correct order the steps of the pipeline 12 connect the input, e.g., the scanner 20, to the output, e.g., the printer 43, and cause a number of events to occur to the data along the way that result in the desired output that the user of the multifunction device 10 requires.

In general, the pipeline 12 receives scanline data from the scanner 20 and outputs the scanline data line by line to the output device, such as the printer 43. In this manner the entire page is not required to be first assembled before initiating the printing process.

Figure 7:
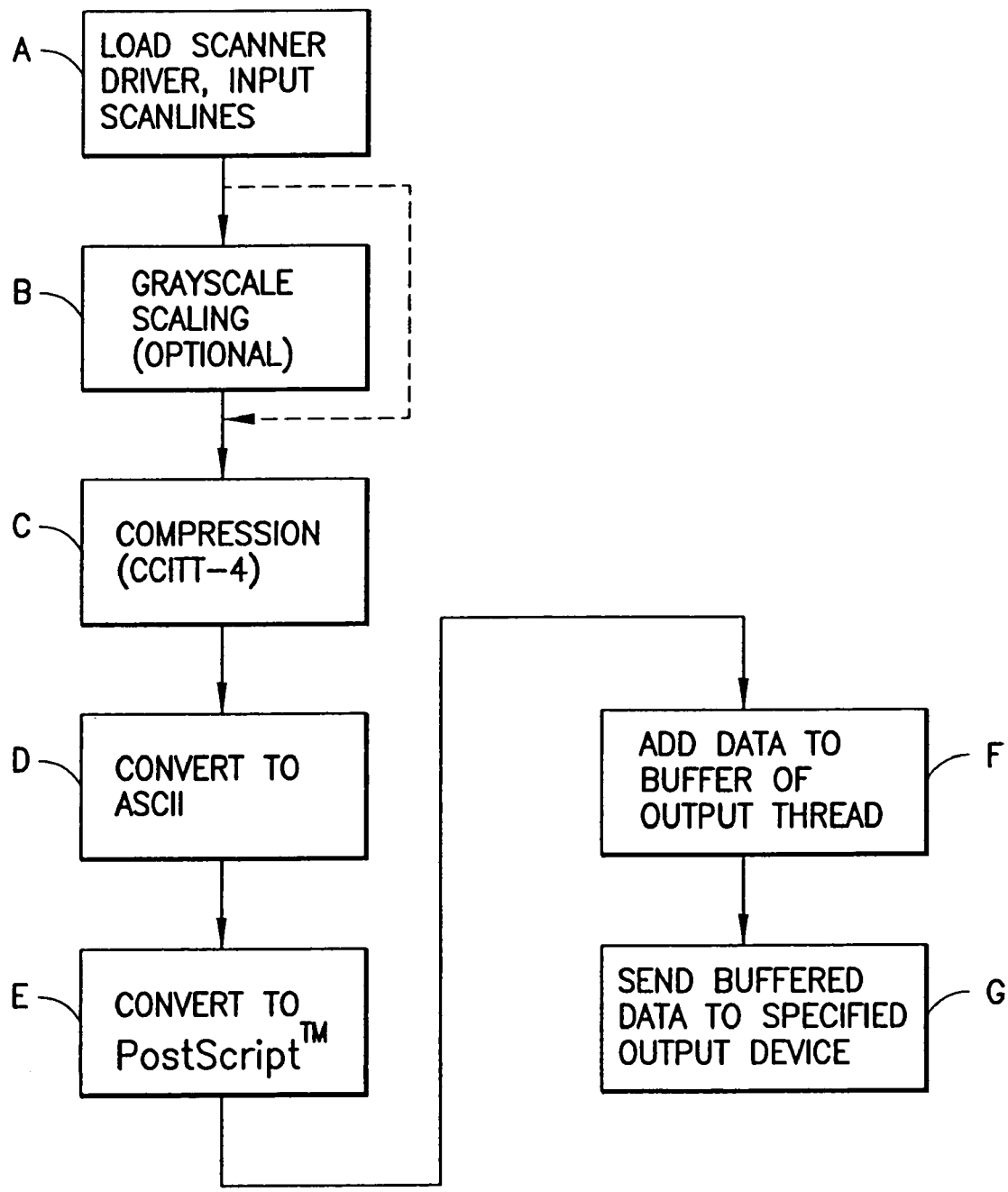
FIG. 7 is a logic flow diagram illustrating an operation of the exemplary document processing pipeline of FIG. 6.

FIG. 7 and the following description present an example of the pipeline 12 and how it may be configured in accordance with a presently preferred system implementation. These steps should not be construed as the only manner in which the pipeline 12 can be configured. For example, certain pipeline stages can be connected to other pipeline stages, and other drivers not expressly listed could be inserted into the pipeline 12 to elicit new behavior and functionality.

Step A: A driver sets up the scanner 20 for scanning, and loads a driver defined by the scanner manufacturer to control the scanner 20. The scanner driver connects to Steps B or C, depending on input from the user.

Step B is used when operating in an image quality mode. This driver takes grayscale data and scales it for printing, while transforming the data into binary data. This step need only be invoked if the user selects an image quality mode of operation. The data output by Step B is provided to Step C for compression.

Step C can vary depending on the type of compression that is required. A presently preferred embodiment employs a CCITT Group 4 compression for binary data. Step C changes when color is used, as CCITT Group 4 compression only supports binary data. However, some type of compression step is preferably included in the pipeline 12 to enhance the efficiency of data transfer to the output device.

Step D converts the compressed data into an ASCII code representable data. For example, the data is transformed into ASCII Hex encoded data, or into ASCII 85 encoded data. Both are well defined standards.

Step E converts the incoming ASCII data into Adobe PostScript™ data. This step need be invoked only if the user intends to send the data to a printer 43, 53 at the end of the pipeline. At this step or stage all of the device-dependant information is added to the data passing through the pipeline 12 for defining the output to a known output device (e.g., a printer). If the current printer is unknown to the system, then it may attempt to use generic PostScript™ information to achieve the results that the user has requested.

Step F takes the input data from Step E and adds it to the buffer of a thread that is communicating with the desired output device. The data can be added to a linked list of buffer data contained within the thread for shipment to the output device.

In Step G the data in the buffer list of the communications thread is packaged and shipped to the desired output device, such as a printer 43 or an e-mail application. This step waits on the output device to be available to accept the data in its buffer.

The foregoing has been but one example of the steps that are taken to transform the incoming scan line data into outgoing raster data. The pipeline 12 is preferably constructed on a per job basis, where the user defines what stages need to be in the pipeline 12, and the system, actually the multifunction controller 25, then connects those stages to provide the user with the desired output.

Figure 5:
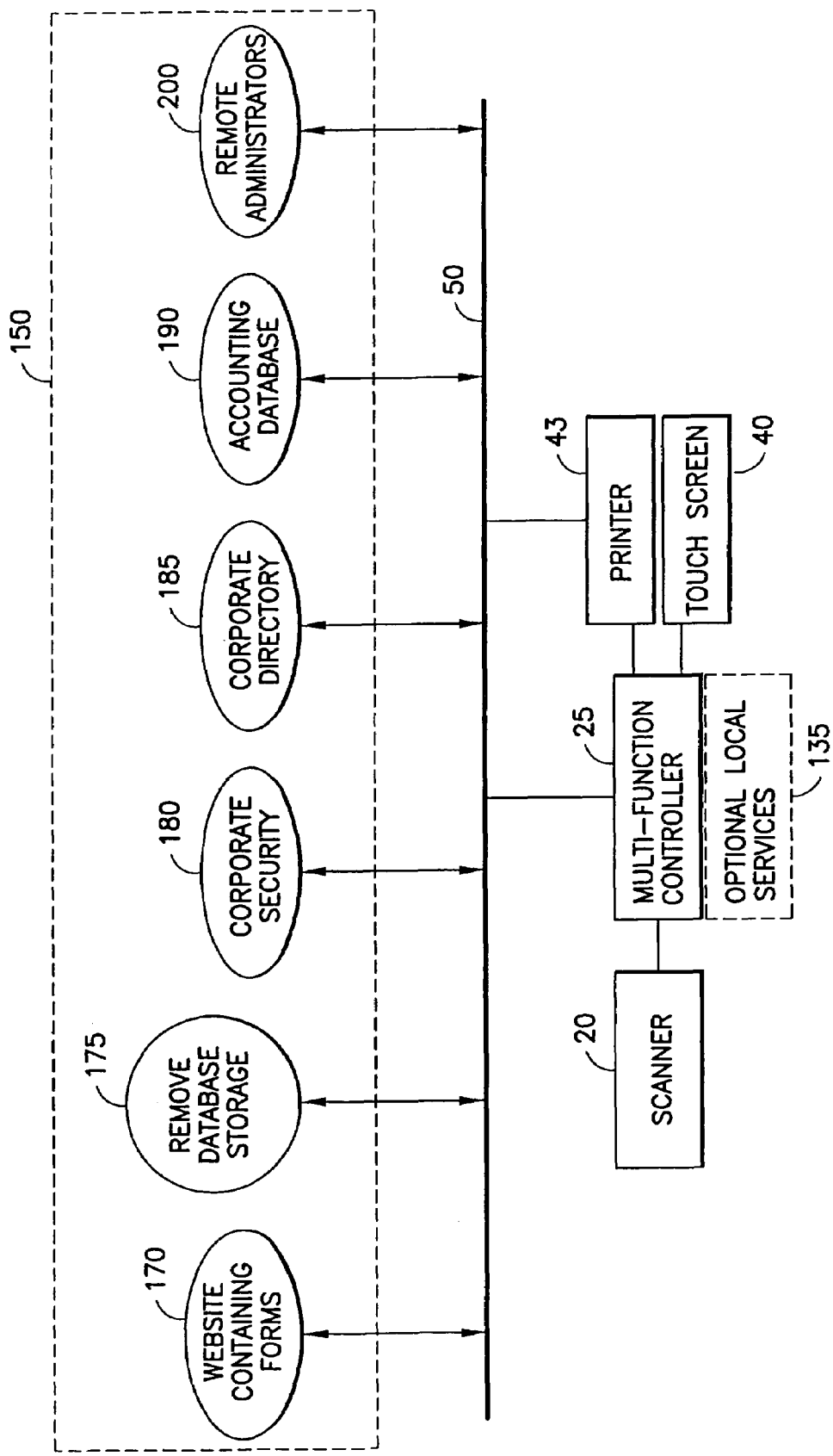
FIG. 5 illustrates exemplary databases that are part of the optional global services of FIG. 4, the databases including, for example, a website containing standard forms, a remote storage database, a corporate security database, a corporate directory, an accounting database, and a remote administration database.

FIG. 5 shows one example of the databases 150 that form a part of the optional global services 55. The databases 150 include, in an example wherein an organization is a corporation, a website containing standard forms 170, a remote storage database 175, a corporate security database 180, a corporate directory 185, an accounting database 190, and a remote administration database 200. Access between the databases 150 and the controller 25 is bi-directional through the global data communications network 50 so that the multifunction controller 25 can both retrieve information from and insert information into the remote databases 150.

The website containing standard forms 170 allows users to access standard forms that an enterprise might use, for example, requisitions, health forms, expense reports, etc. The remote database storage 175 may include any database information that may be useful to users, for example, archived documents, statistical databases for various types of analyses, etc. The corporate security database 180 provides the system with user identification data to verify the identity and access privileges of a particular user. The information can include a particular user's employee number, databases that the user is authorized to access, etc. The corporate directory database 185 can include user profiles, for example, a user's contact information, telephone number, fax number and e-mail address may be stored in the corporate directory database 185. A user may also store a particular fax cover sheet, or cover sheet information in the corporate directory database 185 for automatic retrieval by the controller 25. Upon proper identification of a user, verified by the corporate security database 180, the corporate directory database 185 may pass greeting information to the controller 25 where it may be displayed on the touch screen 40 (FIG. 1) or played as an audio greeting through the speaker 47 (FIG. 1).

The accounting database 190 provides for cost tracking. For example, the multifunction controller 25 may report each time a fax is sent, a page is printed, etc. for allocating the costs of resources among various entities. These reports can thus be accumulated in the accounting database 190.

The multifunction controller 25 also has the ability to accept downloads of various characteristics of the databases 150, for providing an efficient use of the global network 50. For example, the corporate directory database 185 may generate an index on a periodic basis and download the index to the multifunction controller 25, thereby allowing the multifunction controller 25 to quickly determine the location of corporate directory information for a particular user. Index generation may be initiated by either a particular one of the databases 150, or by the multifunction controller 25 itself on a periodic basis. The multifunction controller 25 may also query and download databases or portions of databases immediately or periodically, ensuring that all information presented to the user is the most currently available, while also providing flexibility to ensure efficiency on the network 50 and devices attached to the network 50. These downloads, depending on the nature of the downloaded data and the typical frequency that the data is revised or updated, can occur on an hourly basis, or a daily basis, or a weekly basis, etc.

The remote administrator's database 200 controls the index generation, query cycles, and other types of database administration functions, including access by the multifunction controller 25. For example, it may be desirable for the multifunction controller 25 to have access to only a subset of the databases 150 that are provided as part of the global optional services 55. This limited access is controlled by the remote administrator's database 200.

Using the multifunction device 10 with an internal set of functions, such as fax, copy and e-mail, the teachings herein provide access to data and provide a user with an ability to use all available functions from the touch screen display 40. For example, the user can retrieve a document from a remote datastore 150 and fax, e-mail or print it on a selected device. This information link is dynamic.

By thus integrating this level of connectivity into the multifunction device 10, a user no longer need be concerned with maintaining a copy of the latest organization information, as access to the most recent information can be readily provided. In addition, paper document storage requirements are decreased since the latest organization documents can be accessed and processed through the multifunction device 10 on demand. Not only can these documents be printed, but the other functions of the multifunction device 10 can be utilized to fax the documents, e-mail the documents, and otherwise process these documents. The connectivity via security database 180 also enables access to the remote datastores 150 to obtain user information that can be utilized with the various functions of the system, including keystroke saving functions, limitation of access rights, and accounting information. The multifunction device 10 can be envisioned as a configurable kiosk-like multifunction device that provides connectivity to many facets of an organization's infrastructure, allowing costs to be reduced while productivity is increased.

Examples of the use of the multifunction system 10 in a corporate environment include the following. Assume that a corporation's human resource documents are stored on a website, and also assume that administrative assistants keep copies of these forms in filing cabinets, so that they can be quickly retrieved. Using the multifunction system 10 one can access the website and have the latest, most up-to-date versions of these documents printed, faxed or e-mailed on demand. The user can select the quantity to be printed or copied, and uses the walkup kiosk-like GUI 13, much as an office worker would use a conventional document copier. The multifunction device 10 may also check the website periodically ensure that it has a current list of documents. Then, when a document is chosen, that document is dynamically downloaded each time it is requested, ensuring that only up-to-date documents are utilized. This avoids the problem that arises when paper copies of certain forms are kept in a filing cabinet, and are not replaced when a particular form is deleted, depleted, revised, or superseded by another form.

As another example, assume that a company wishes to enable secure printing. Through the network connectivity of the multifunction device 10, documents can be accepted from remote users. Then, when the user is at a local device, they can identify themselves to the system via a secure method, such as badge swiping or fingerprint or retinal scanning. The user identification information is then checked against a corporate database to ensure access privileges, such as the corporate security database 180 of FIG. 5. The validated user is then provided access to all documents waiting for him or her, and can print, fax, and/or e-mail from the multifunction device 10. Once the user is identified to the multifunction device 10, the user's name and other employee or personal information can be appended to any outgoing documents automatically, such as e-mail and faxes, freeing the user from the time wasting effort of typing in this information manually, or manually creating items such as fax cover pages.

Assume further that a given company wishes to replace its fax machines, and has a large corporate directory stored in a database and website. The teachings herein provide the ability to connect to the corporate directory and make it accessible to the multifunction device 10. The user can then employ the touch screen interface 40 to locate another user by their partially entered name. The interface 10 then displays the recipient's e-mail and fax information so that the user can select between faxing or e-mailing the document to the recipient.

Figure 8B:
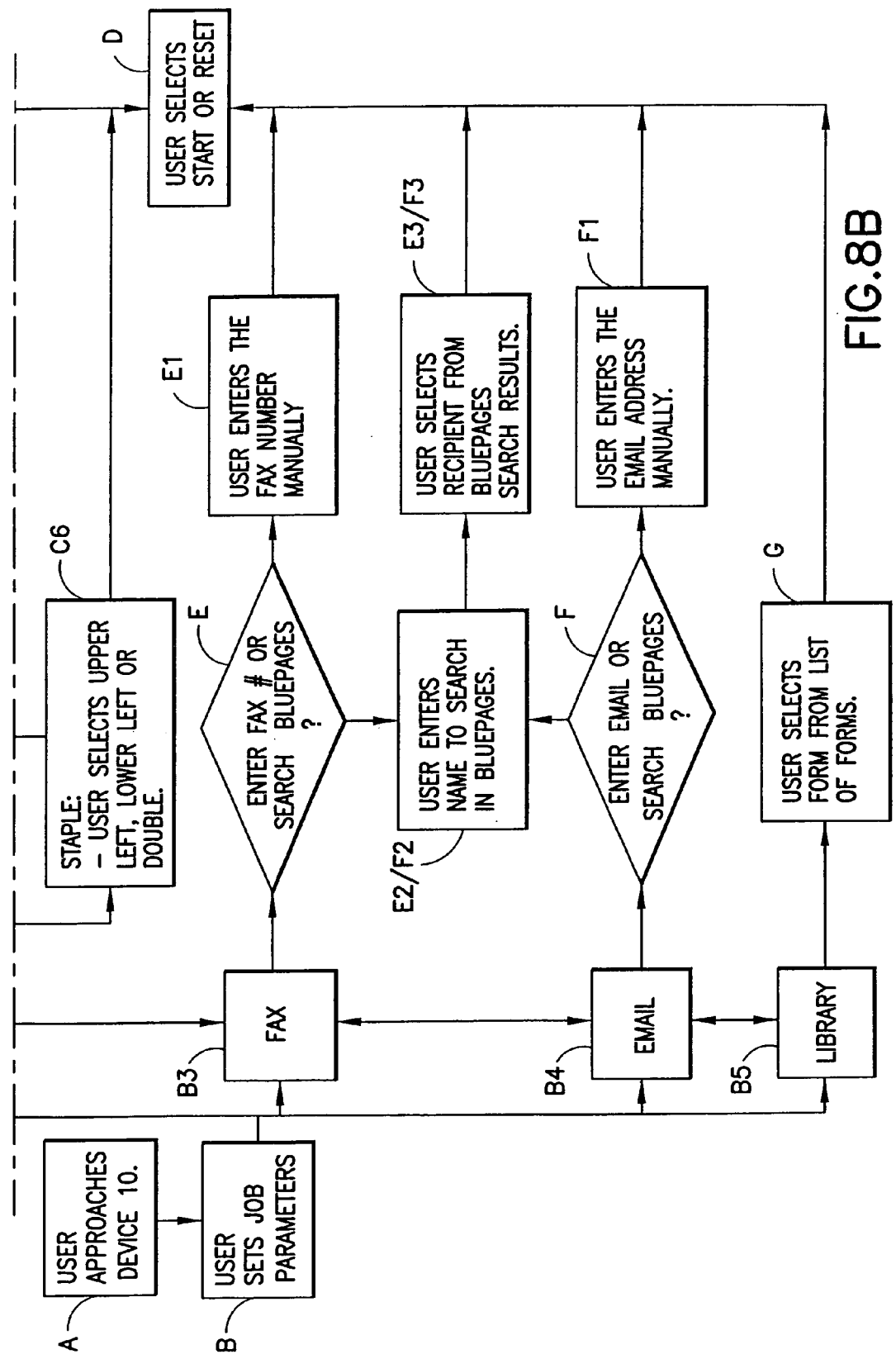
FIG. 8 is a logic flow diagram that is exemplary of the overall user control of the multifunction device, via the Graphical User Interface (GUI)

FIG. 8 is a logic flow diagram that is exemplary of the overall user control of the multifunction device 10, via the Graphical User Interface (GUI) 13. At Step A the user approaches the multifunction device 10 and at Step B the user set the parameters for a particular job. The Step B entails selecting and setting parameters for one or a plurality of job types. The job types or options that can be selected using the GUI 13 include, but need not be limited to, a scan option (B1), a copy/printing option (B2), a fax option (B3), an e-mail option (B4) and a library function option (B5). It should be apparent from the arrows running vertically between the job options B1-B5 that more than one can be selected. For example, the user can select job option B1 to scan a document, as well as options B2-B4 to print, fax and then e-mail the scanned document, respectively. Alternatively, the user could select job option B5 to access a particular form, as well as job option B2 to print the selected form.

When selecting job options B1 and B2 the user is further enabled to set a number of job parameters (or the user may simply use default parameters). The user-settable job parameters include, but need not be limited to, quality, e.g. text or image/text (C1), exposure (C2), number of sides (C3), number of copies (C4), paper tray, e.g., letter/legal (C5), and staple options (C6). Note that while job parameters C1-C3 are more specific to the document scan job option B1, all of the job parameters C1-C6 can apply to the print/copy job option B2. While not specifically indicated in FIG. 8, the various scan options can preferably be set at anytime, such as when setting copy, fax, e-mail and library options.

After selecting none, one, some or all of the job parameters C1-C6 control passes to Step D, where the user presses either a Start key on the touch screen GUI 13 to start the selected job, or the user presses a Reset key on the touch screen GUI 13 to cancel the selected job and to reset any changed job parameters to their default values. The system also automatically resets after a predetermined timeout period (e.g., one minute).

If the user selects the fax job option B3 control passes to Step E where the user manually enters, using an on-screen keyboard/keypad, the recipient's fax number (Step E1), or where the user searches the local fax number book or directory database 135, or the appropriate global database 150, by entering at least a partial name or other information for locating and selecting the intended fax recipient (Steps E2 and E3). Control then passes to Step D to Start the fax job, or to cancel (Reset) the fax job.

If the user selects the e-mail job option B4 control passes to Step F where the user manually enters the recipient's e-mail address (Step F1), or where the user searches the local e-mail address book or directory database 135, or the appropriate global database 150, by entering at least a partial name or other information for locating and selecting the intended e-mail recipient (Steps F2 and F3). Note that the same directory or other database may have both the fax number and the e-mail address for various potential recipients, and that these need not be stored in separate databases. For example, all contact information for a particular potential recipient, including voice phone number, fax number, cellular phone number, e-mail address, mail station and the like can be stored in one database entry. In any event, control then passes to Step D to Start the e-mail job, or to cancel the e-mail job.

It should be remembered that a document can be sent to multiple output locations, such as a plurality of facsimile and/or e-mail recipients.

If the user selects the library job option B5 control passes to Step G where the user selects a form from the list of forms maintained either by the local forms database 135, or from the appropriate global database 150, such as the website containing forms 170. Control then passes to Step D to possibly print the selected form.

Reference can be had to FIGS. 9A-9F for examples of screens displayed to a user of the multifunction device 10 using the GUI 13. Note in FIGS. 9A, 9B, 9D and 9F the Scan Options portion as described above in conjunction with FIG. 8, whereby the quality, exposure and number of sides can be selected. Note as well in FIG. 9A that a first Tab has been selected (Copy/Print). The above-mentioned Copy/Print options are also displayed (tray, staple, printer (B&W)). The desired number of copies can be entered, and then the Start button depressed (or the Reset button).

It should be noted that it is not necessary to completely finish specifying all Copy/Print options (or all scanner options for that matter) before pressing a Tab key to, for example, specify the Fax or Email mode.

Figure 9A:
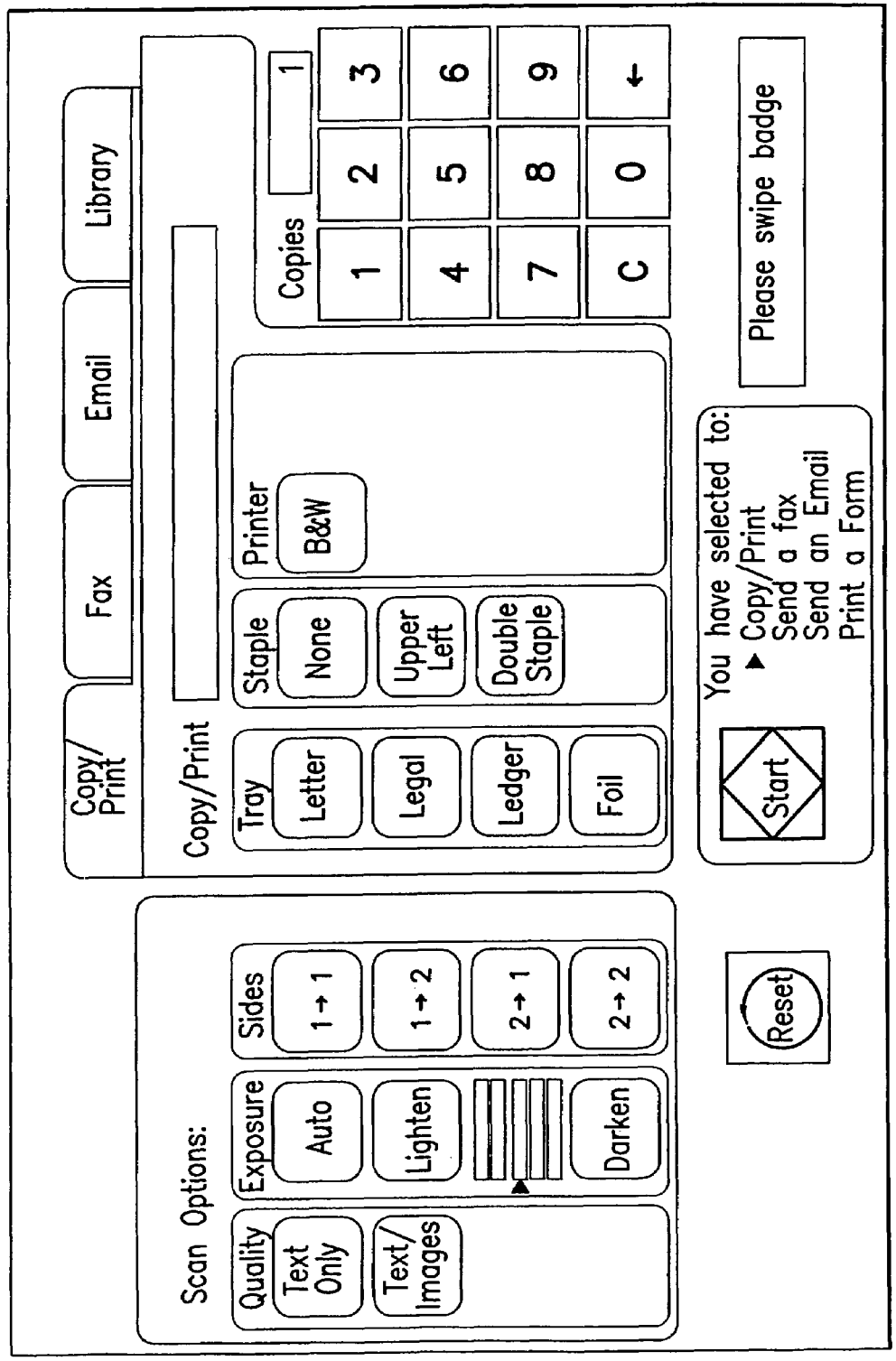
Figure 9B:
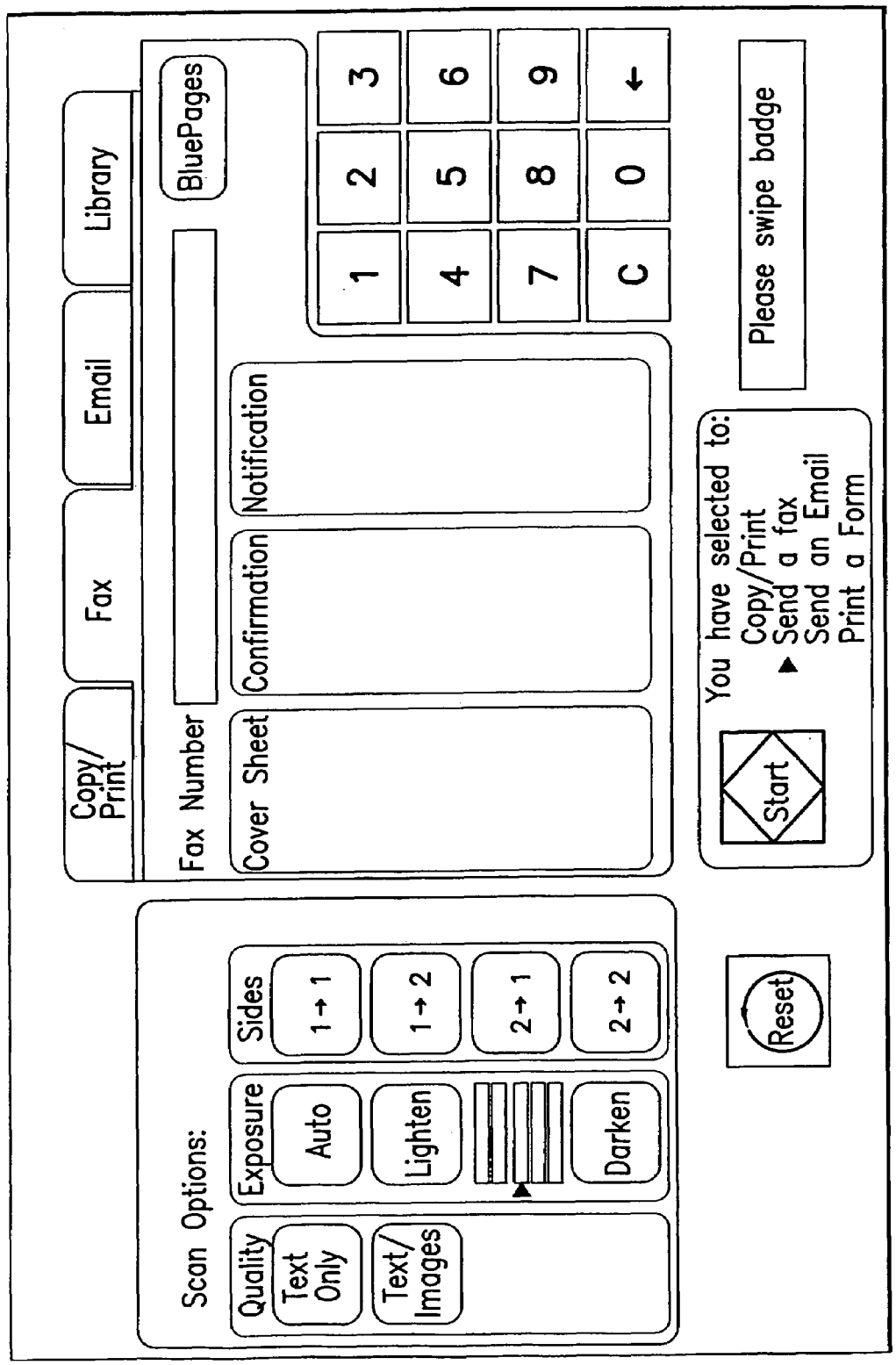
Figure 9C:
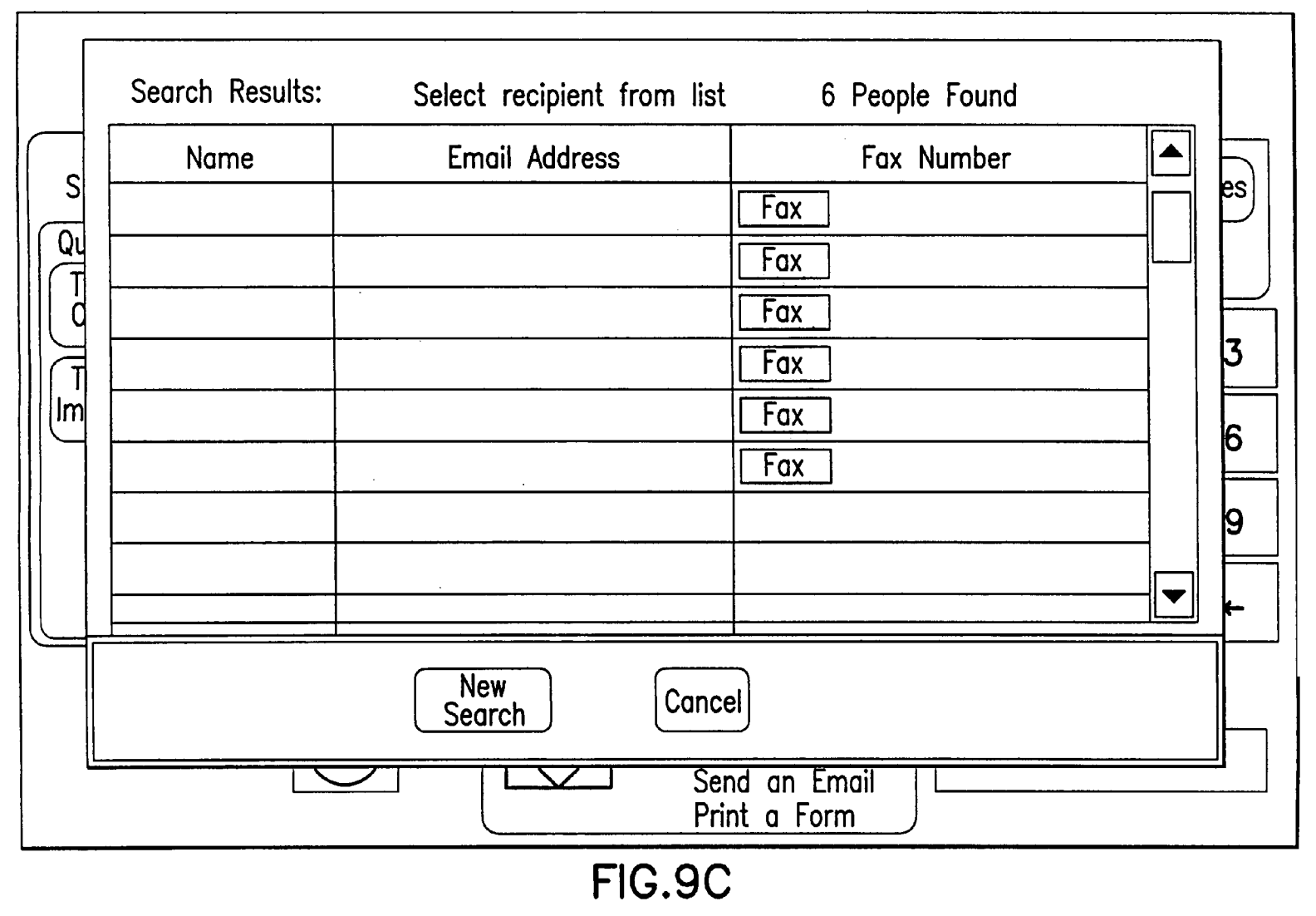

In FIG. 9B a second Tab has been selected (Fax). At this time the user is enabled to enter the recipient's fax number using the numeric keypad, and to select cover sheet options. If the "BluePages" button is selected instead, the keyboard screen of FIG. 9E can be displayed, whereby the user is enabled enter all or a portion of a name, followed by depressing the OK button. A search is then conducted in, for example, the Directory database 185, and in FIG. 9C a list of possible matching names and fax numbers is displayed (as well as e-mail addresses if available). The user can scroll through the list until a desired fax number is found, which can then be selected by pressing the associated Fax button.

Figure 9D:
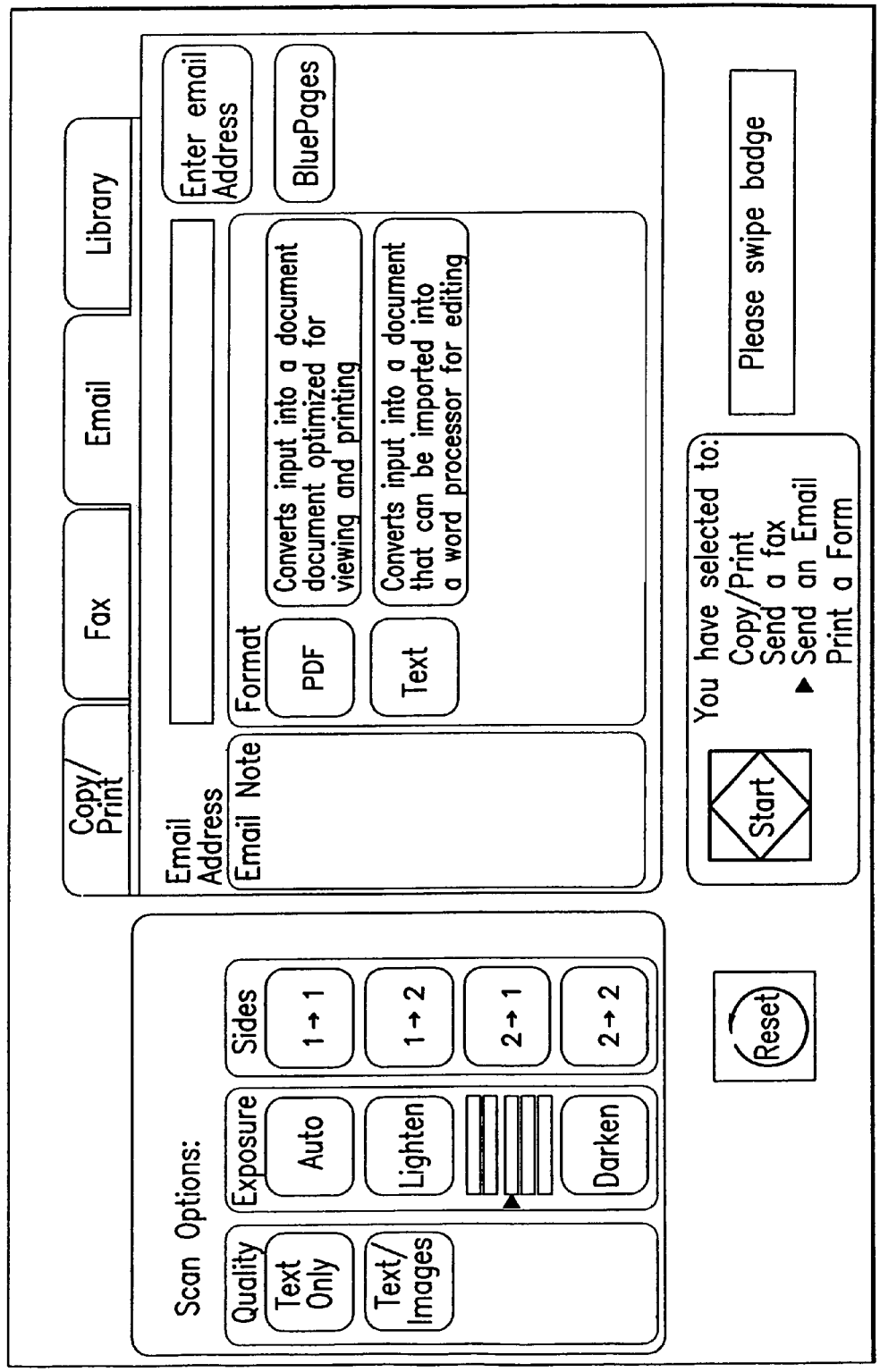

In FIG. 9D a third Tab has been selected (Email). At this time the user can enter the recipient's e-mail address (if known), after pressing the Enter Email Address button, using the alphanumeric keyboard screen shown in FIG. 9E.

Figure 9E:
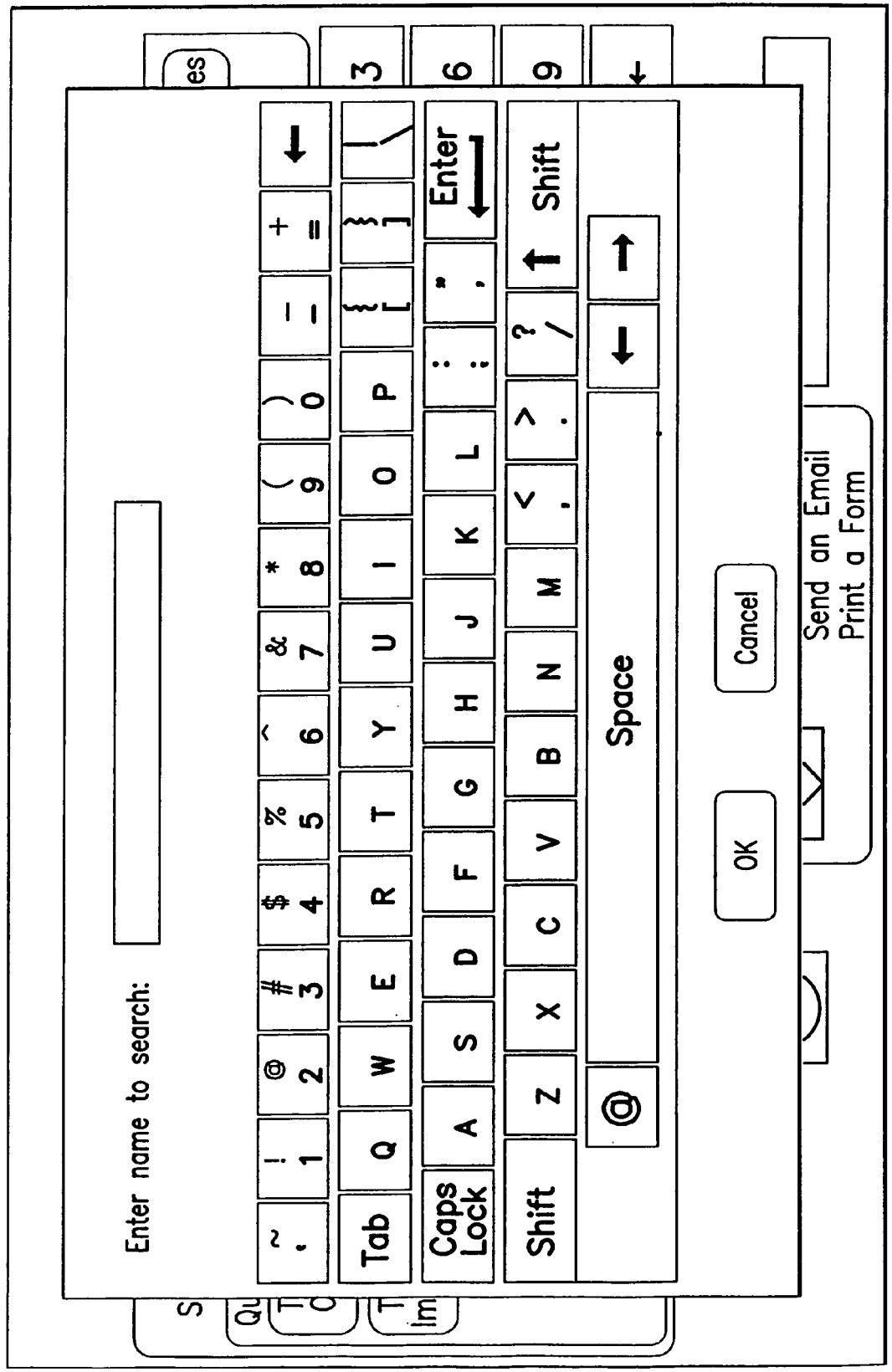

To facilitate the entry of the e-mail address a "@" key is provided, as most touch screens do not support the simultaneous depression of two "keys", or Shift and "2" in this case. If the e-mail address is not known, then the "BlueP-ages" button can be selected instead, the keyboard screen of FIG. 9E is displayed, and the user is enabled enter all or a portion of the name, followed by depressing the OK button. The search is then made in the Directory database 185, and in FIG. 9C the list of possible matching names and e-mail addresses is displayed. The user can scroll through the list until a desired e-mail address is found. The e-mail can be sent in one of two user-selectable formats (PDF or Text), and is transmitted when the Start button is pressed by the user.

Figure 9F:
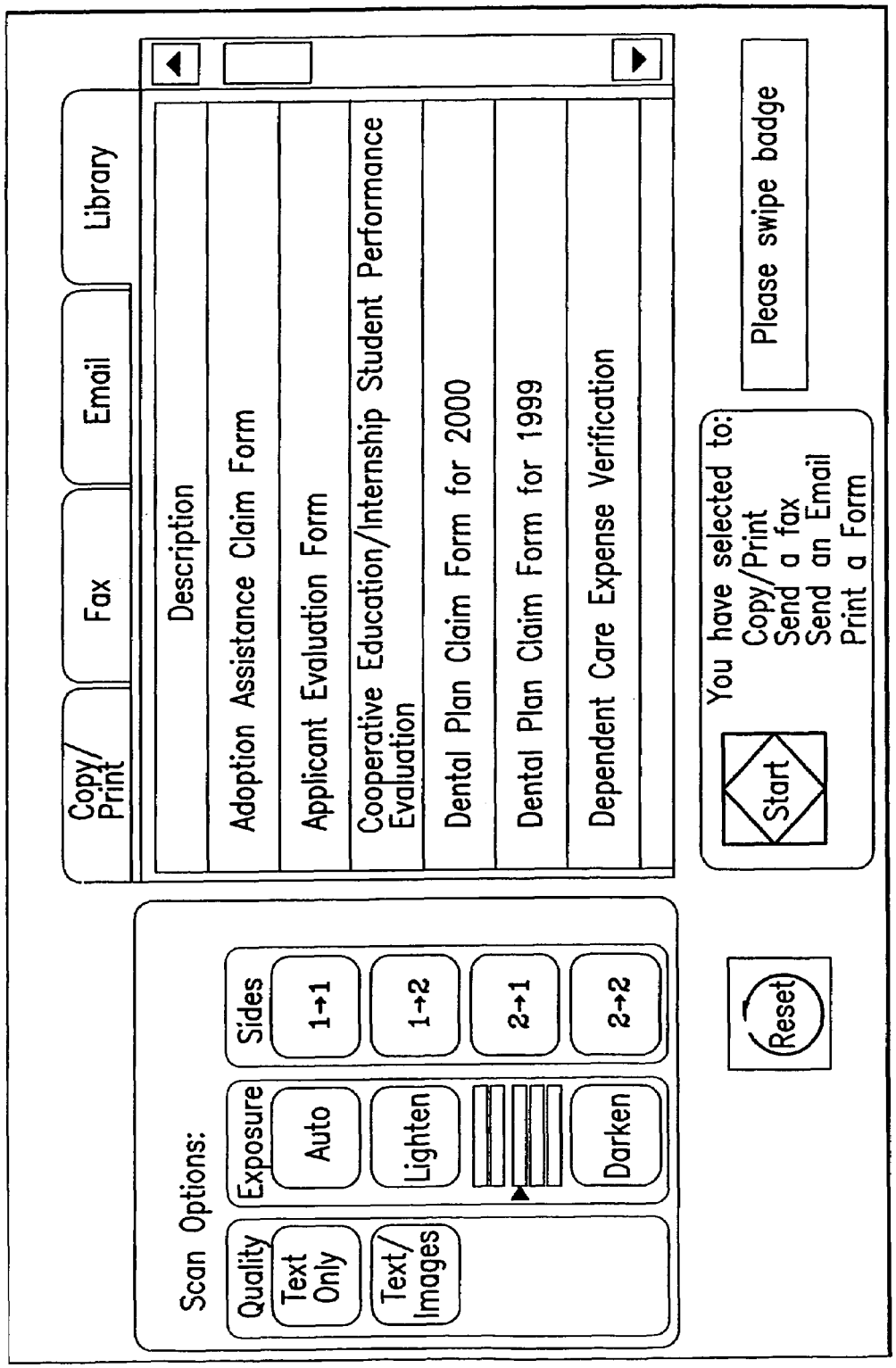

In FIG. 9F a fourth Tab has been selected (Library). In response, the multifunction controller 25 accesses the remote website containing forms 170 (or accesses the local forms database if available) and displays the current forms index. The user is enabled to scroll through the displayed forms index until a desired form is located, which can then be selected by touching the form name. The Copy/Print Tab button can then be touched to print or copy the form is desired, or the form could be faxed or e-mailed to a desired recipient or recipients, as described above.

Although described above in the context of specific document functions, input/output devices, system architectures and the like, those skilled in the art should appreciate that these are exemplary and indicative of presently preferred embodiments of these teachings, and are not intended to be read or construed in a limiting sense upon these teachings.

Thus, while the invention has been particularly shown and described with respect to preferred embodiments thereof, it will be understood by those skilled in the art that changes in form and details may be made therein without departing from the scope and spirit of the invention.

What is claimed is:

1. Apparatus comprising:
   a first interface which receives first input data from a document source and a second interface which outputs processed input data to at least one printer;
   a third interface which couples to a global data communications network which receives current document data as well as up to date recipient contact information therefrom;
   a controller which couples said first, second and third interfaces, includes a local database, controls the reception of the first input data and the outputting of the processed input, and allows for user initiated transmission of the first input data received through said first interface as an email through said third interface; and
   a graphical user interface which controls the operation of said controller, including controlling access to and searching of the local database and one or more remote databases coupled to said global data communications network,
   wherein said controller further receives second input data from a second document source through said third interface and allows for user initiated transmission of the second input data received through said third interface as an email through said third interface.

2. Apparatus of claim 1 wherein said one or more remote databases are up to date databases which comprise a database of forms, a security database, and a directory database.

3. Apparatus of claim 2 wherein the local database duplicates at least a portion of information stored in the one or more remote databases.

4. Apparatus of claim 1 further comprising:
   a fourth interface coupled to said controller; wherein said graphical user interface controls the operation of said controller for accessing and searching a database containing recipient contact information for sending the processed input as at least one of an email that contains processed input data through the third interface and a facsimile through the fourth interface.

5. Apparatus of claim 4 wherein the processed input is simultaneously sent as both an email through the third interface and as a facsimile through the fourth interface.

6. Apparatus of claim 4 wherein said global data communications network is comprised of the Internet.

7. A multifunction device, comprising:
   a first interface for receiving input data from a document source and a second interface for outputting the input data to at least one printer;
   a third interface for coupling to a global data communications network for retrieving a current document from a remote database coupled to the global data communications network; and
   a graphical user interface for controlling the operation of the multifunction device, including receiving user input selecting a destination for the current document or for the input data;
   a multifunction controller coupled to the first interface, coupled to the second interface, coupled to the third interface and coupled to the graphical user interface, the multifunction controller adapted to output the current document or the input data to the at least one printer using the second interface based on the destination, or to email the current document or the input data to an email recipient based on the destination.

8. The multifunction device of claim 7, further comprising:
   a fourth interface,
   wherein the multifunction controller is further adapted to transmit a facsimile to a facsimile recipient using the fourth interface if the destination indicates the facsimile recipient.

9. The multifunction device of claim 8, wherein the input data or the current document is simultaneously sent as both an email through the third interface and as a facsimile through the fourth interface.

10. The multifunction device of claim 7, wherein the remote database comprises a database of forms, a security database, and a directory database of recipient contact information.

11. The multifunction device of claim 10, wherein the graphical user interface is further adapted to receive user input selecting the email recipient from the recipient contact information.

12. The multifunction device of claim 7, wherein the multifunction device further comprises a local database that duplicates at least a portion of information stored in the remote database, the local database being accessible by the multifunction controller.

13. The multifunction device of claim 7, wherein the multifunction controller further receives second input data from a second document source through the third interface and allows for user initiated transmission of the second input data received through the third interface as an email through the third interface.

14. The multifunction device of claim 7, wherein the global data communications network is comprised of the Internet.

15. A multifunction device, comprising:
- a first interface for receiving input data from a document source and a second interface for outputting the input data to at least one printer;
- a third interface for coupling to a global data communications network for retrieving recipient contact information from a remote database coupled to the global data communications network;
- a local database for storing the recipient contact information;
- a graphical user interface for controlling the operation of the multifunction device, including receiving user input selecting a destination for the input data from the recipient contact information; and
- a multifunction controller coupled to the first interface, coupled to the second interface, coupled to the third interface, coupled to the local database and coupled to the graphical user interface, the multifunction controller adapted to output the input data to the at least one printer using the second interface if the destination indicates printing of the input data, or to email the input data to the destination using the third interface if the destination indicates an email recipient.

16. The multifunction device of claim 15 further comprising:
- a fourth interface,
- wherein the multifunction controller is further adapted to transmit the input data as a facsimile to the destination using the fourth interface if the destination indicates a facsimile recipient.

17. The multifunction device of claim 15, wherein the remote database comprises a database of forms, a security database, and a directory database of recipient contact information.

18. The multifunction device of claim 15, wherein the multifunction device further comprises a local database that duplicates at least a portion of information stored in the remote database, the local database being accessible by the multifunction controller.

19. The multifunction device of claim 15, wherein the multifunction controller further receives second input data from a second document source through the third interface and allows for user initiated transmission of the second input data received through the third interface as an email through the third interface.

20. The multifunction device of claim 15, wherein the input data is simultaneously sent as both an email through the third interface and as a facsimile through the fourth interface.

* * * * *